Jan. 8, 1952     B. C. COONS     2,581,634
PEAR FEEDING AND ORIENTING APPARATUS
Filed Dec. 5, 1944     6 Sheets-Sheet 1

Inventor
BURTON C. COONS
By Philip A. Minnis
Attorney

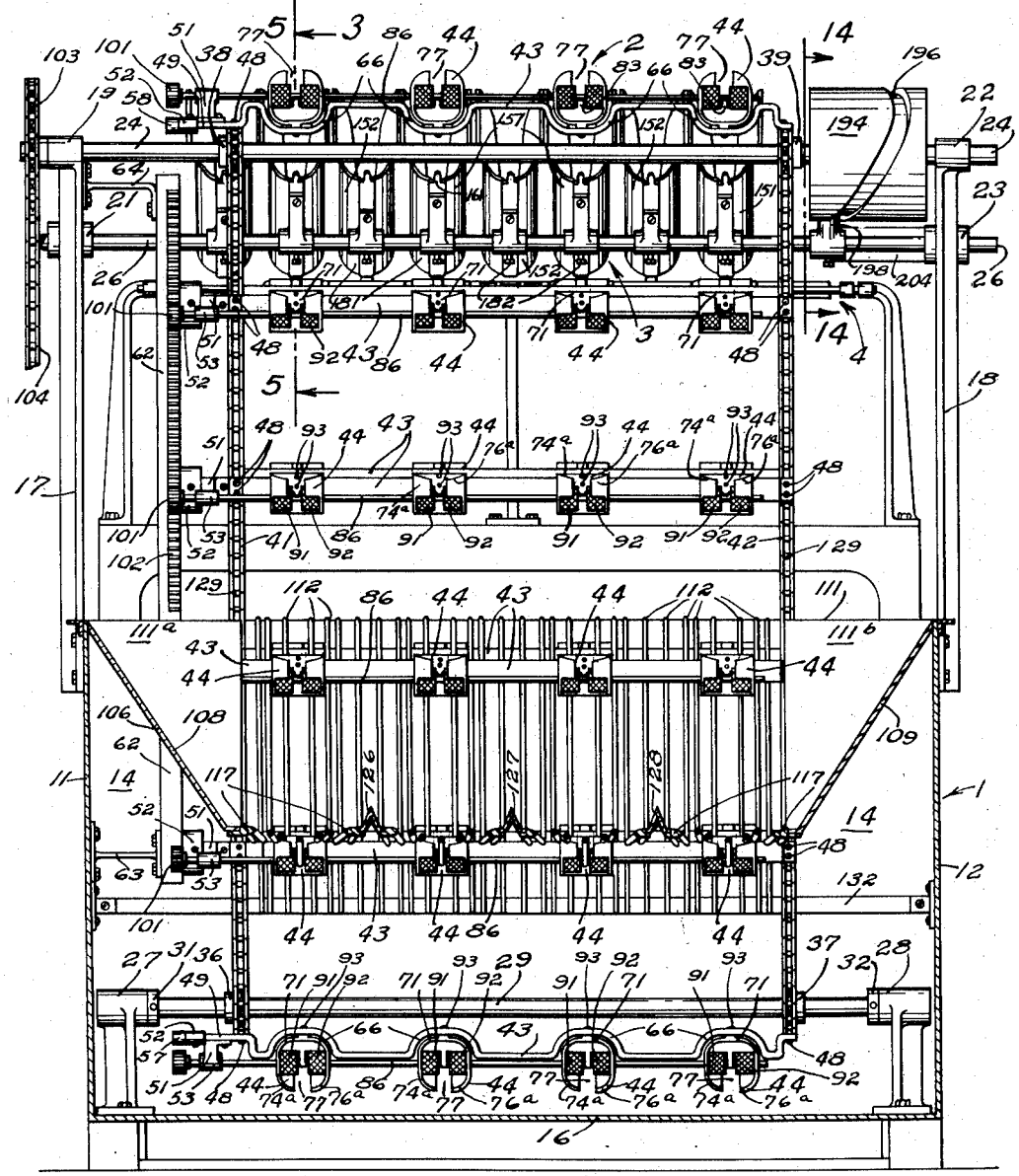

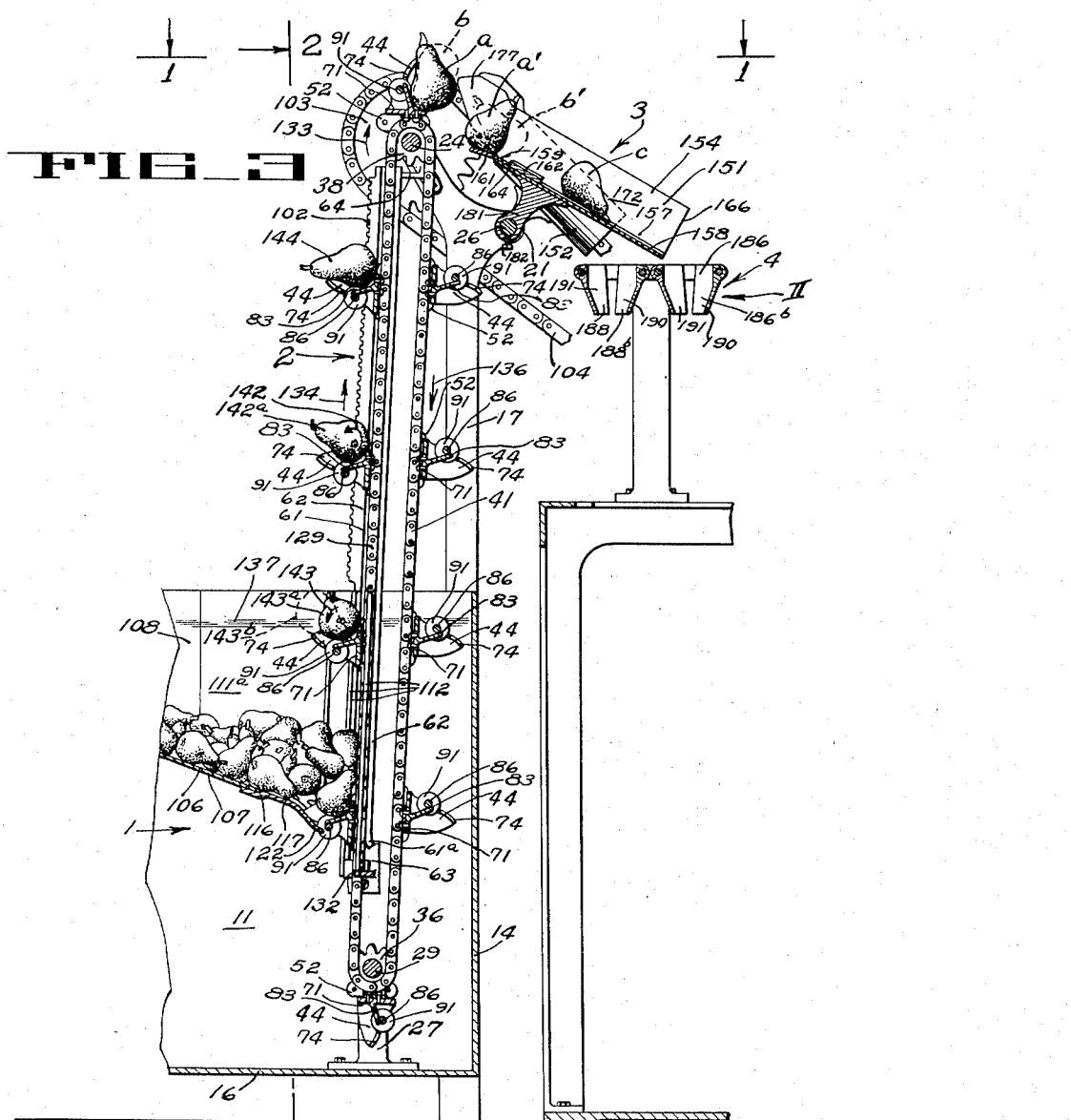

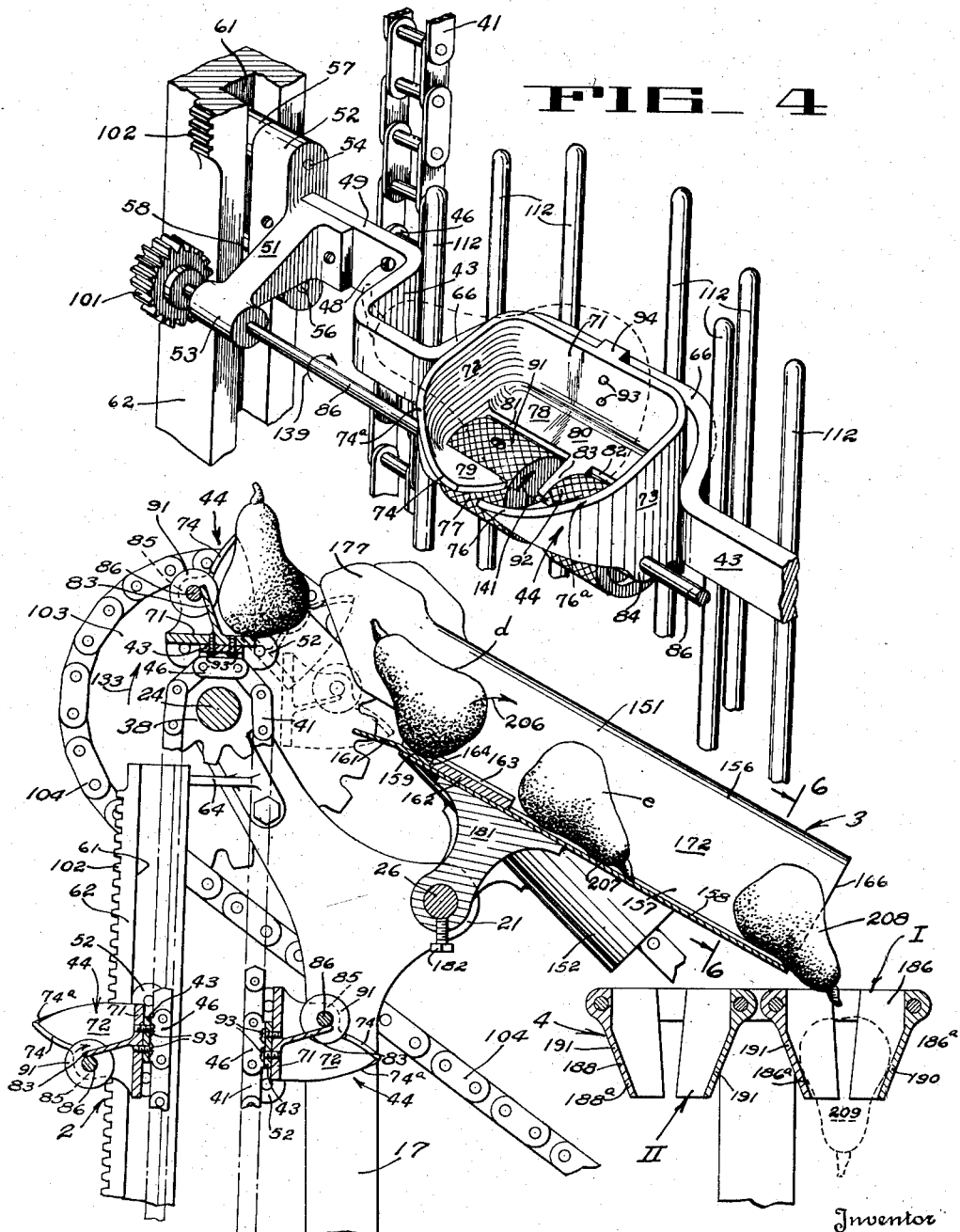

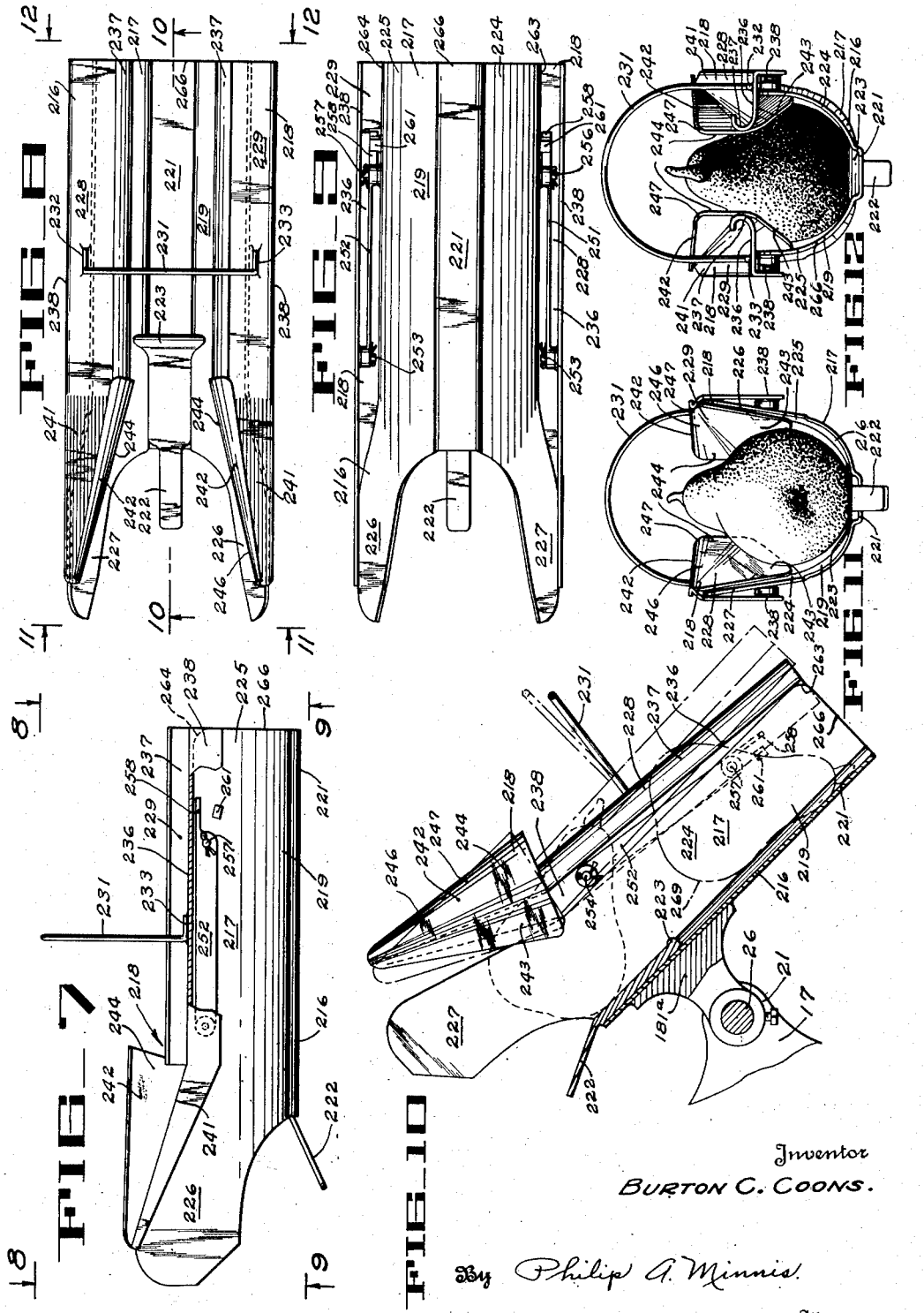

Jan. 8, 1952  B. C. COONS  2,581,634
PEAR FEEDING AND ORIENTING APPARATUS
Filed Dec. 5, 1944  6 Sheets-Sheet 6
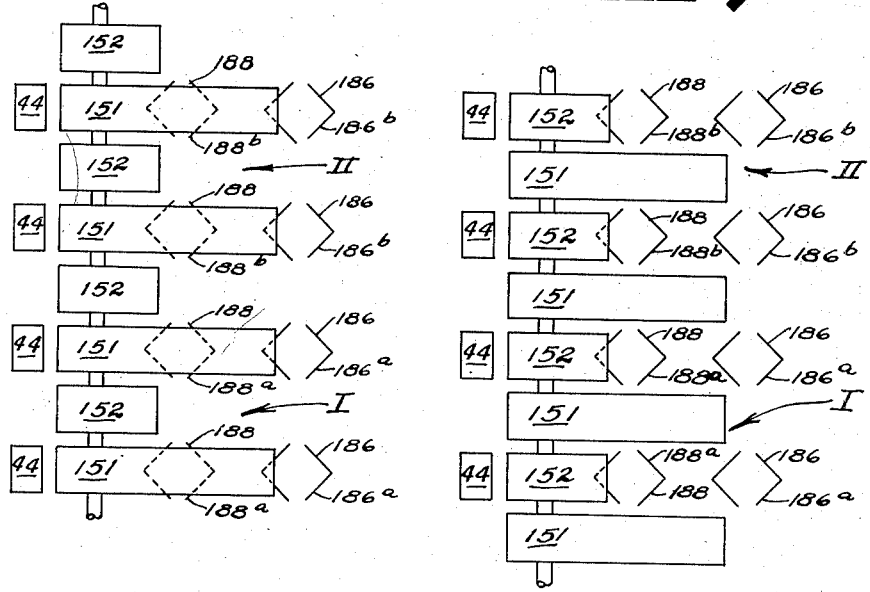
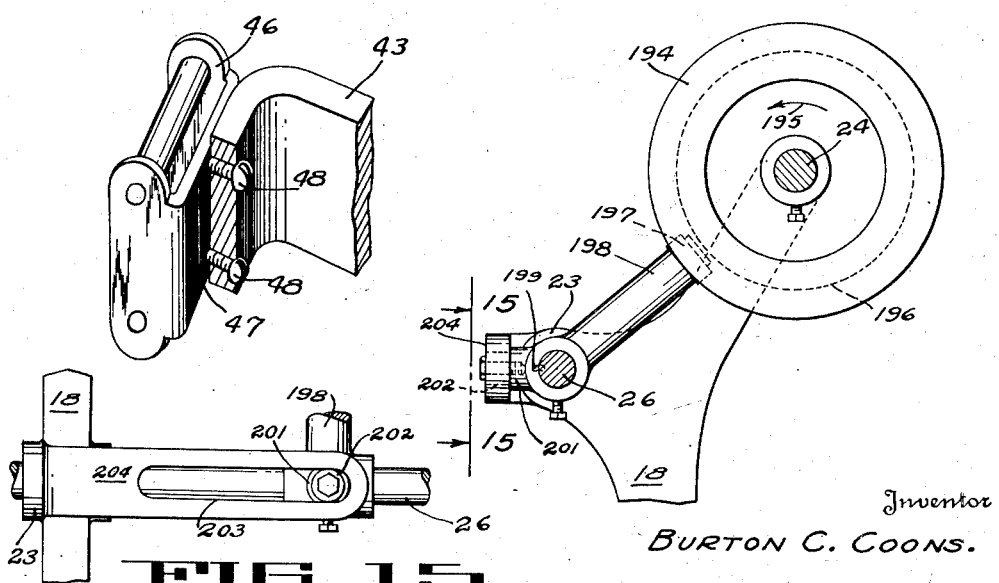
Inventor
BURTON C. COONS.
By Philip A. Minnis
Attorney Patented Jan. 8, 1952

2,581,634

UNITED STATES PATENT OFFICE 2,581,634

PEAR FEEDING AND ORIENTING APPARATUS

Burton C. Coons, San Jose, Calif., assignor to Food Machinery and Chemical Corporation, a corporation of Delaware Application December 5, 1944, Serial No. 566,694

13 Claims. (Cl. 198—33)

The present invention is concerned with certain new and useful improvements in apparatus for orienting and feeding fresh pears.

In my Patent No. 2,431,310 issued November 25, 1947, I have disclosed and described one suitable form of pear orienting and feeding apparatus adapted to deliver pears in properly timed relation and predetermined uniformly oriented position to a desired place of reception, as, for example, to the receiving cups of a pear preparation machine.

The apparatus of the present invention is designed for the same purposes as the other but embodies certain improvements thereover and is of simplified construction so that it is not only less expensive to manufacture but occupies less floor space and may therefore be used where maximum economy is desired and a minimum of floor space is available.

It is, therefore, the general object of this invention to provide a pear orienting and feeding apparatus of simple and inexpensive construction and which requires a minimum amount of floor space.

It is also an object of the invention to provide a pear orienting and feeding apparatus which is adapted for handling pears of all sizes and configuration and in which the orientation of the pears is automatically controlled in accordance with the size of the fruit.

Another object of the invention is to provide a pear orienting and feeding apparatus of large capacity and efficient operation.

Other objects and advantages of the invention will become apparent from the following description and the accompanying drawings in which:

Fig. 2 is a section of the machine shown in Fig. 1 taken along line 2—2 thereof.

Fig. 3 is a longitudinal section of a portion of the machine shown in Figs. 1 and 2 taken along line 3—3 thereof, some pears being shown in various stages of feeding during the operation of the machine.

Fig. 4 is an enlarged perspective view of a portion of the machine illustrating a feed cup and parts operatively associated therewith.

Fig. 5 is an enlarged longitudinal section of a portion of the machine taken along line 5—5 of Fig. 2 and showing a pear in various positions during feeding and orientation thereof.

Fig. 6 is a cross section of a feed chute shown in Fig. 1 taken along line 6—6 thereof.

Fig. 7 is a side view of a modified form of feed and orienting chute, certain portions being broken away while others are shown in section.

Fig. 8 is a plan view of the feed and orienting chute of Fig. 7 taken along line 8—8 thereof.

Fig. 9 is a bottom view of the feed and orienting chute of Fig. 7 taken along line 9—9 thereof.

Fig. 10 is a longitudinal section through the feed and orienting chute taken along line 10—10 of Fig. 8, the chute being shown in its inclined position as installed in the machine in conjunction with a portion of its supporting and actuating mechanism, certain parts of which are shown in section while other are illustrated in elevation.

Fig. 11 is a front view of the feed and orienting chute taken in the direction of arrows 11—11 of Fig. 8, a pear being shown as it enters the chute.

Fig. 12 is a rear view of the chute taken along line 12—12 of Fig. 8, a pear being shown in the front end of the chute.

Fig. 13 is a perspective view of a chain link and a portion of a transverse bar of the elevator mechanism of the machine.

Fig. 14 is an enlarged vertical section of a portion of the machine taken along line 14—14 of Fig. 2.

Fig. 15 is a side elevation of a portion of Fig. 14 taken along line 15—15 thereof.

Figs. 16 and 17 are diagrammatic views illustrating the operation of the feed chute assembly of the machine.

Figure 1:
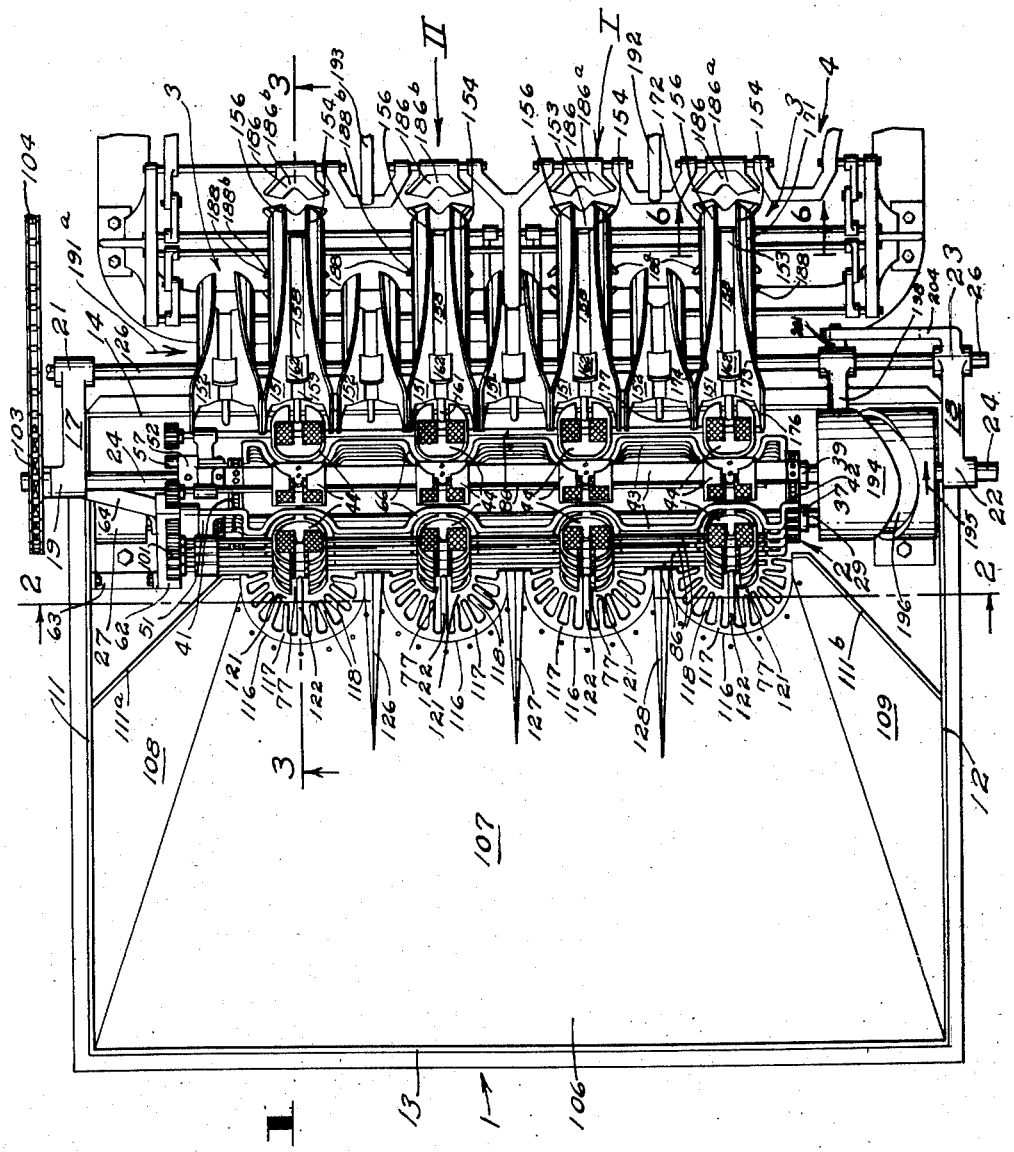
Fig. 1 is a plan view of the pear feeding and orienting mechanism of the present invention in conjunction with a pear feeding or transfer unit of a pear preparation machine.

In general, the mechanism of the present invention comprises a tank 1, an elevator mechanism 2 and a feed and orienting chute assembly 3. Divisional applications for United States Letters Patent have been filed on the chute assembly and elevator mechanism, that on the former bearing Ser. No. 762,113 and on the latter 762,114. Both of said divisional applications were filed July 19, 1947. The pears are deposited in a promiscuous mass into the tank 1 from which individual pears are fed at predetermined intervals by the elevator mechanism 2 into the feed chute assembly 3. During conveyance of the pears from the tank 1 to the chute assembly 3 the individual pears are oriented in predetermined manner by the elevator 2 and are subsequently deposited thereby into the chute assembly 3 wherein they are finally oriented and from which they are fed stem end first either into stationary fruit receiving pockets of a pear feeding mechanism 4 such as shown in my copending application, Serial No. 507,517, filed October 25, 1943 and now Patent No. 2,431,310 granted November 25, 1947, for Fruit Handling Machine, or directly into the fruit receiving and holding cups of a pear preparation machine such as, for instance, shown in my United States Patent No. 2,187,075 dated January 16, 1940.

Referring now more specifically to the drawings and especially to Figs. 1, 2, and 3 thereof, it will be noted that the tank 1 of the feeding and orienting mechanism of the present invention is of rectangular construction and comprises side walls 11 and 12, a front wall 13, a rear wall 14 and a bottom 16.

Secured to the side walls 11 and 12 of the tank 1, adjacent the rear wall 14 thereof, are standards 17 and 18 provided with bearings 19, 21 and 22, 23, respectively. Rotatably mounted within the bearings 19 and 22 is a transverse shaft 24, while slidably mounted within the bearings 21 and 23 is a transverse shaft 26.

Positioned within the tank 1 and secured to the bottom 16 thereof are bearings 27 and 28 within which a transverse shaft 29 is rotatably mounted which is provided with retaining collars 31 and 32 (Fig. 2). Keyed to the shaft 29 and spaced from each other are sprocket wheels 36 and 37 while keyed to the shaft 24 and spaced with respect to each other are sprocket wheels 38 and 39. The sprocket wheels 36 and 38 are positioned in alignment with each other and trained around the same is an endless elevator chain 41 (Figs. 2 and 3). The sprocket wheels 37 and 39 are also arranged in alignment with respect to each other and trained around the same is an endless elevator chain 42.

Secured to the elevator chains 41 and 42, at equally spaced intervals, are a plurality of transverse bars 43, each one of which is provided with a plurality of pear receiving and orienting cups or buckets 44. To permit attachment of the transverse bars to the sprocket chains 41 and 42 the latter are provided at equal intervals with bar supporting links 46 (Fig. 5) each having a web portion 47 (Fig. 13) to which the transverse bars 43 are secured by means of screws 48.

One end of each transverse bar 43 extends beyond the sprocket chain 41 as shown at 49 in Figures 2 and 4, and carries a bracket 51 provided with a guide block portion 52 and a bearing portion 53. Fixed within the guide block portion 52 are stud shafts 54 and 56 upon which rollers 57 and 58, respectively, are rotatably mounted which are adapted to travel within a guide channel 61 of a stationary guide rail 62 during a portion of the travel of the cross bars 43 more specifically referred to later on. The lower ends of the side walls of the guide channel 61 are flared outwardly at 61a (Fig. 3) to assure entry of the rollers 57 and 58 into the channel during the operation of the machine. The guide rail 62 is secured to the side wall 11 of the tank 1 and the standard 17 by means of brackets 63 and 64, respectively, and is disposed parallel to the sprocket chain 41 (Fig. 3). The transverse bars 43 are bent as shown at 66 to receive the cups 44 in the recesses formed thereby for purposes to be explained later on.

Each of the elevator cups 44 (Fig. 4) comprises a rear wall 71 and side walls 72 and 73 terminating in front wall portions 74 and 76, respectively, which are curved toward and spaced from each other as shown at 77. The upper ends of the side and front walls 72, 74 and 73, 76 of each cup form continuous edges 74a and 76a, respectively, which are gradually forwardly declined toward the free space 77 therebetween (Figs. 2, 4, and 5) for engaging and guiding the neck end of the pear during the orientation of the fruit in the cup. Each cup 44 is further provided with a bottom 78 having a forwardly inclined portion 79 and a rearwardly inclined portion 80. The bottom 78 of each cup is cut away at 81 and 82 (Fig. 4) in such a manner as to provide a downwardly extending tongue 83.

Rotatably mounted within the bearing portion 53 of each bracket 51, previously referred to, and extending through bearing portions 84 and 85 of all of the cups 44 on each transverse bar 43 is a shaft 86 (Fig. 4). Fixed to the shaft 86 below the bottom of each cup are spaced pear positioning rolls 91 and 92 provided with a knurled surface as shown in Figure 4. The rolls 91 and 92 project partially through the cut out portions 81 and 82, respectively, into the cups a sufficient distance above the bottom thereof so as to engage the bulb portion of a pear supported therein. The tongue 83, previously referred to, extends downwardly between the rolls 91 and 92 toward the shaft 86 (Figs. 3, 4, and 5) to prevent entry of the stem of a pear between the rolls behind the shaft 86. The cups 44 are secured to the transverse bars 43 in a position as clearly shown in Figure 4 by means of screws 93 which are screwed into a reinforced portion 94 of the cups.

Keyed to one end of each shaft 86 extending beyond the bearing portion 53 is a pinion 101 adapted to intermesh with a rack portion 102 on the guide rail 62 and forming an integral part therewith.

Keyed to the shaft 24 is a sprocket wheel 103 which is driven by means of a sprocket chain 104 either by a separate motor or directly by the fruit handling or processing machine in conjunction with which the feeding and orienting mechanism of the present invention is used.

Mounted within the tank 1 between the side walls 11 and 12 and the front wall 13 thereof is a fruit supply hopper 106 (Figs. 1 and 2) which comprises a bottom 107, side walls 108, 109 and a rear wall 111 formed by rear wall sections 111a and 111b and a plurality of spaced vertical rods 112. The bottom 107 is declined toward the rear wall 111 and terminates sufficiently in front of the vertical rods 112 to provide an open space for the front run of the elevator chains 41 and 42 and the transverse bars 43 to permit free travel thereof through the hopper 106. The bottom 107 is further provided with semi-circular cut out portions 116 (Fig. 1) and mounted on the bottom 107 and extending into said semi-circular cut out portions are semi-circular grate structures 117, each one of which is provided with a plurality of radially disposed fingers 118 arranged to form semi-circular openings 121 in the bottom of the hopper for the passage of the feed cups 44. A long finger 122 of each grate structure 117 is provided to extend into the space 77 (Fig. 1) between the front wall portions 74 and 76 and the orienting rolls 91 and 92 of each cup 44 during its travel past the same. The fingers 122 prevent falling of the fruit from the hopper 106 through the openings 121 into the bottom of the tank 1. The side walls 108 and 109 of the hopper 106 are slanted (Figs. 1 and 2) and partitions 126, 127, and 128 formed in the bottom 107 intermediate adjacent grate structures 117 are provided to guide the fruit in the hopper 106 toward the openings 121 thereof. The partitions 126, 127, and 128 are of inverted V-shaped configuration in cross section as shown in Figure 2.

The guide rods 112 which form a portion of the rear wall of the hopper 106 are positioned behind the front runs 129 of the elevator chains 41 and 42 and are secured at their lower ends to a transversely disposed supporting bar 132 fastened to the side walls 11 and 12 of the tank 1 of the machine. The bar 132 provides the sole support for the guide rods 112 which extend upwardly parallel to the chains 41 and 42 directly behind the transverse bars 43.

The sprocket wheel 103 and shaft 24 are driven in the direction of arrow 133 (Figs. 3 and 5) causing a corresponding rotation of sprocket wheels 38 and 39 to effect travel of the elevator chains 41 and 42 and the transverse bars 43 and cups 44 supported thereby in the direction of arrows 134 and 136 (Fig. 3) around the shafts 24 and 29.

The pears to be oriented and fed by the machine of the present invention are dumped in a promiscuous mass into the supply hopper 106 and gravitate downwardly along the inclined bottom 107 thereof upon the semi-circular grate structures 117 from which they are removed one after another by the cups 44 upon the operation of the elevator mechanism 2. To prevent bruising of the pears as they are dumped into the supply hopper 106 and to prevent bridging of the fruit therein the tank 1 and supply hopper 106 are filled with water to the approximate level as shown at 137 (Fig. 3). Since the pears are slightly heavier than the water they will sink therein, and gravitate to the lowest portion of the hopper. However, due to the buoyant effect of the water, the pears accumulated at lowermost region of the hopper and not received within the cups 44 and elevated thereby are easily pushed away without damage or bruising thereof as the cups travel upwardly through the promiscuous mass of pears.

While the elevator mechanism 2 is in operation and while the cups 44 travel upwardly through the hopper 106 a single pear is received in each cup 44 since the size of each cup is such as to accommodate only one pear therein. If a pear enters a cup bulb portion first during the upward travel of the cup through the mass of pears in the hopper 106, as shown in Fig. 3, it will remain therein with the bulb portion of the pear resting in contact with one or both rolls 91 and 92 and with the stem end of the fruit projecting from the cup in any angular position it may assume. The pears so received within the cups are lifted through the mass of pears out of the hopper 106 while the remaining fruit within the hopper slides out of the path of the cups 44 and the pears therein and immediately settles again at the bottom of the hopper above the openings 121 for removal therefrom by the succeeding cups.

During the upward travel of the transverse bars 43, the rollers 57 and 58 of each bar enter the guide channel 61 of the guide bar 62 so that the transverse bars and cups 44 are firmly guided (Fig. 3) during their elevation toward the shaft 24.

After the pears have been received within the cups 44 of each transverse bar 43 and have been lifted thereby from the supply hopper 106, the pinion 101 of the shaft 86 associated with each bar 43 and the transverse row of cups carried thereby engages the teeth of the stationary rack 102 so that during further upward travel of the cups 44 each shaft 86 is rotated in the direction of arrow 139 (Fig. 4) causing a corresponding rotation of the rolls 91 and 92 of each elevator cup 44 in the direction of arrow 141 until the pinion 101 disengages from the rack 102 at the upper end thereof prior to the travel of the transverse bars 43 and cups 44 around the shaft 24.

Therefore, after the fruit has been received within each cup 44 and while the same is elevated in the direction of arrow 134 (Fig. 3), the bulb portion of the pear rests upon one or both rolls 91 and 92 in frictional engagement therewith and upon rotation of the rolls in the direction of arrow 141 during further upward travel of the cups (Fig. 4), the pear in each cup is caused to rotate or turn on its bulb portion, depending upon its original position in the cup, either in the direction of arrow 142 or in the direction of arrow 143 (Fig. 3). When the pear is in a position as shown at 142a in Fig. 3 and rotated in the direction of arrow 142, the stem end of the fruit is swung toward the free ends of the front walls 74 and 76 until the pear assumes a position with its stem end pointing outwardly from the cup toward, or substantially toward, the front end of the machine as shown at 144 in Figure 3. When a pear is in a position as shown at 143a in Fig. 3 and its bulb portion is subsequently rotated in the direction of arrow 143, the neck portion of the pear is caused to roll along the declined upper edge 74a of the front and side wall portions 72 and 74 of the cup 44 toward the front end thereof whereby the pear is turned sidewise into a position as shown at 144.

After each pear in a transverse row of feed cups 44 has been oriented in substantially predetermined position as shown at 144 (Fig. 3), and while it remains in this position, the pinion 101 disengages from the rack 102 causing cessation of the rotation of the rolls 91 and 92. Thereupon the oriented pears are subsequently discharged from the cups 44 blossom end down as shown in full lines at a and a' in Fig. 3, into the feed and orienting chute assembly 3 previously referred to as the cups are tilted while they travel around the shaft 24.

However, if a pear enters the cup stem end first, the heavy bulb portion of the fruit projects from the cup so that the pear will usually be pushed out of the same by the other fruit in the hopper 106 as it is elevated through the same while another pear enters the cup bulb end first and takes its place.

It sometimes happens, however, that a pear which enters a cup stem end first remains therein and is elevated thereby, such pear is not oriented by the rolls 91 and 92 as above described, since its bulb portion does not contact the rolls. However, in view of the forwardly declined edges 74a and 76a of the elevator cup which engage the bulb portion of the fruit, the bulb portion of the pear will roll or slide downwardly along the same whereby the pear is turned until its bulb portion is disposed substantially above the free space 77 between the free ends of the edges 74a and 76a with the bulb portion of the pear projecting from the front end of the cup as shown in dotted lines at 143b in Fig. 3. Thereupon, as the cups are tilted during their travel around the shaft 24, these pears are discharged sidewise with the bulb portion in leading position into the feed and orienting chute assembly 3 as shown in dotted lines at b and b' in Fig. 3.

The arrangement of the cups 44 within the recesses 66 of the transverse bars 43 disposes the shafts 86 directly below the bars 43 and permits a close spacing of the bars 43 and shafts 86 with respect to the guide rods 112 whereby lodging of the fruit between bars 43 and shafts 86 or between the bars 43 and guide rods 112 and lifting of the fruit thereby out of the hopper 106 is prevented.

The feed and orienting chute assembly 3 is disposed intermediate the elevator 2 and the feed or transfer mechanism 4 and is mounted for transverse back and forth movement therebetween. The chute assembly 3 comprises a plurality of open ended feed and orienting chutes 151 and 152, arranged adjacent each other in alternate order (Fig. 1). All of the chutes are of identical construction with the only exception that the chutes 151 are considerably longer than the chutes 152. Therefore, the description of the construction of only one chute 151 will be sufficient for all.

The chute 151 (Figs. 1, 2, 3, 5, and 6) is of substantially tubular configuration and is open at its top over the entire length thereof as shown at 153 (Fig. 1). The wall portions 154 and 156 of the chute adjacent its open top 153 are bent upwardly and outwardly as shown in Figure 6. The bottom portion 157 of the chute is provided with a rectangular guide channel 158 which extends longitudinally of the chute over the entire length of the bottom 157 (Figs. 1 and 5). The front end of the guide channel 158 is closed by a plate 159 provided with a tongue 161 projecting forwardly from the front end of the bottom 157 of the chute toward the elevator mechanism 2 in slightly declined position relative to the chute. Positioned behind the plate 159 and secured to the bottom 157 of the chute is an abutment block 162. This block closes a further portion of the channel 158, projects slightly above the bottom 157 and has an upper surface 163 which is curved in conformity with the bottom surface 157 of the chute. The front edge 164 of the abutment block 162 is adapted to engage the bulb portion of pears deposited sidewise with the bulb portion in leading position into the chute 151 by the elevator mechanism 2, as shown in dotted lines at b' in Fig. 3, so as to effect turning of these pears as they gravitate toward the rear or discharge end 166 of the chute to dispose the stem ends of the pears in leading position in which the same are subsequently maintained by their contact with the chute and their reception in the guide channel 158 thereof to thereby effect discharge of the pears stem end first from the chute 151. The pears discharged bulb end down into the chute, as shown in full lines at a' in Fig. 3, topple readily over with their stem ends into leading position as they gravitate down the chute without the assistance of the abutment 162 and are maintained in this position by the chute and the guide channel 158 for discharge stem end first therefrom.

The side wall portions 171 and 172 of the chute 151 as well as the upwardly and outwardly bent portions 154 and 156 thereof are flared outwardly toward the front end of the chute, as shown at 173 and 174, and terminate into outwardly flared and upwardly inclined guide walls 176 and 177 projecting from the front end of the chute which straddle the cups 44 as they pass the same (Figs. 1, 3, and 5).

The guide walls 176 and 177 and the curved portions 154 and 156 of the chute 151 are adapted to guide the stem end of the fruit toward the center of the chute and to facilitate the entry of the pear into the tubular portion of the chute in such a manner that when the pear is turned with its stem end into leading position either with or without assistance by the abutment block 162 during the downward gravitation of the pear along the chute, in a manner as previously referred to herein, the stem end of the fruit will enter the guide channel 158 whereby the fruit is maintained in oriented position as it gravitates through the chute and is discharged therefrom.

The tongue 161 is so constructed and arranged that it will enter the opening 77 in the front end of the elevator cups 44 cooperating therewith and permit passage of the cups 44 without interference therewith.

Each of the feed and orienting chutes 151 and 152 is supported in rearwardly declined position on the shaft 26 previously referred to by means of supporting brackets 181 adjustably mounted on the shaft 26 but normally held in fixed position thereon by means of set screws 182.

The long feed and orienting chutes 151 are rearwardly declined in such a manner as to feed the pears oriented thereby stem end first into fruit receiving pockets 186 of the pear feeding device 4, while the short feed and orienting chutes 152 are rearwardly declined in such a manner as to feed the pears oriented thereby stem end first into fruit receiving pockets 188 of the feed device 4. The angular disposition of the chutes 151 and 152 being such as to assure gravitation of the pears therethrough and proper discharge therefrom. By loosening and subsequently tightening the set screws 182 the angularity of the chutes may be adjusted as desired.

The construction of the feed or transfer mechanism 4, only fragmentarily shown in Figures 1, 2, 3, and 5, corresponds to that disclosed in my copending application, Serial No. 507,517, previously referred to herein. In general, this feed mechanism 4 comprises a group of pockets 186a and 188a designated group I and a group of pockets 186b and 188b designated group II (Figs. 1, 16, and 17). Each of these pockets comprises two separate pivotally mounted members 190 and 191 forming an open bottomed substantially frusto conical cup which is opened and closed in timed relation with the operation of the fruit receiving means of a fruit preparation machine associated therewith (not shown).

The fruit receiving pockets 186a and 188a of group I are simultaneously opened and closed under the control of an actuating arm 192, while the pockets 186b and 188b of group II are opened and closed simultaneously under the control of an actuating arm 193. The actuating arms 192 and 193 are operated in timed relation by the fruit preparation machine in connection with which the transfer mechanism 4 is used. Both groups of pockets I and II are alternately operated. However, their operation is such that there is a considerable period during which the pockets of both groups are closed and ready to receive fruit as will be apparent from my copending application above referred to.

As previously stated, the chutes 151 and 152 are mounted in alternate order on the transversely movable shaft 26 and it should be further noted that the chutes are so arranged and spaced with respect to each other that when the large chutes 151 are in alignment with the pockets 186a and 186b and the cups 44 of the elevator mechanism 2 (Figs. 1 and 16), the short chutes 152 are out of alignment with the cups 44 and the fruit receiving pockets 188a and 188b. After the pears have been fed in oriented position to the pockets 186a and 188a by the chute 151 the whole feed chute assembly 3 is transversely shifted in the direction of arrow 191a (Fig. 1) so as to align the short feed chutes 152 with the elevator cups 44 of the elevator mechanism 2 and the pockets 188a and 188b of the feed mechanism 4 into which the next pears are fed (Fig. 17). Thereupon the feed chute assembly 3 is returned to its original position as shown in Figures 1 and 16 and in this manner the cycle of operation of the feed chute assembly repeats and continues during the operation of the machine.

The shifting of the feed chute assembly 3 in the manner as above described is effected by a rotary cam 194 (Figs. 1, 2, and 14) which is fixed on the shaft 24 for rotation therewith in the direction of arrow 195 in Figures 1 and 14. The rotary cam 194 is provided with a groove 196 within which a cam roller 197 (Fig. 14) rotatably mounted on an arm 198 is received. The arm 198 is mounted on the shaft 26 and is fixed thereto by means of a key 199. Rotatably mounted on the free end 201 of arm 198 is a roller 202 (Figs. 14 and 15) which is received within a guide slot 203 of a transversely extending guide bracket 204 disposed parallel to shaft 26 and forming an integral part of the standard 18 previously referred to. The cam groove 196 of the rotary cam 194 is undulated in such a manner as to shift the arm 198, the shaft 26 and the feed chute assembly 3 carried thereby transversely back and forth from the position shown in Figure 16 to the position shown in Figure 17 in timed relation with the operation of the conveyor mechanism 2 and the feed mechanism 4 to effect alternate feeding of pears to the pockets 186a, 186b, and 188a, 188b, in the manner above referred to. During the back and forth movement of the feed chute assembly 3, the roller 202 travels back and forth in the guide slot 203 of bracket 204 but prevents rotation of arm 198, shaft 26, and assembly 3.

From the above it will, therefore, be seen that when the feed chute assembly 3 is in the position as shown in Figures 1 and 16, the pears received and oriented within the cups 44 of one bar 43 are discharged thereby, depending on their position in the cups, either blossom end down, as shown in full lines at a' (Fig. 3), or on their side with the blossom end in leading position, as shown in dotted lines at b' (Fig. 3), into the feed chutes 151 as the elevator cups are tilted during their travel around the shaft 24 and begin their downward movement in the direction of arrow 136 (Fig. 3).

The pears are normally discharged blossom end down from the cups 44 and are deposited stem end up between the flared extensions 176 and 177 at the receiving ends of the chutes 151 so that they fall with their blossom ends upon the tongues 161 of the chutes, as shown in full lines at a' in Fig. 3. The flared extensions 176 and 177 of each feed chute 151 guide the stem end of the pear toward the center of the chute, while the momentum imparted upon the pear during its discharge from the cup 44 and the inclination of the chute to cause the pear to topple over on its side whereby the stem end of the pear is disposed into leading position, as shown at c in Fig. 3. Thereupon, the pear lying on its side slides downward along the chute and discharges stem end first therefrom.

Any pears, however, received stem end first in the cups 44 are discharged from the elevator cups sidewise into the chute with their blossom ends disposed in leading position, as shown in dotted lines at b' in Fig. 3, and are guided into the chute by the flared extensions 176 and 177 as they slide downwardly along the chute. During the downward travel of these pears, the bulb or blossom end thereof strikes against the front edge 164 of the abutment block 162, as shown in full lines at d in Fig. 5, whereby the downward movement of the blossom end of the pear is retarded. In view of the momentum imparted upon the fruit during its discharge from the elevator cups, the fruit is caused to topple over in the direction of arrow 206 (Fig. 5) as soon as the downward movement of the bulb or blossom end thereof is retarded by the abutment block 162 whereby the pear is disposed with the stem end thereof in leading position with the pear lying on its side, as shown at e in Fig. 5, in which position the pear now gravitates downward the inclined chute and finally discharges stem end first therefrom.

In either case, however, as the pear topples over, the stem end thereof is guided by the upwardly and outwardly curved portions 154 and 156 of the chute until the pear is received entirely within the feed chute 151 and the stem end thereof is disposed in leading position. During this orientation of the fruit, the stem end thereof drops into the guide channel 158 in the bottom 157, as shown at 207 (Fig. 5), which maintains the pear with its stem end in leading position and guides the pear during its further travel through the chute so that the pear leaves the discharge end 166 of the chute stem end down, as shown at 208 (Fig. 5), and subsequently slides stem end first into the pocket 186a disposed therebeneath in closed or fruit receiving position. Due to the conical configuration of the pocket 186a, the fruit is disposed and supported stem end down therein as shown in dotted lines at 209 in Figure 5.

The diameter of the tubular chutes 151 and 152 is larger than the diameter of the fruit but is such that when a pear has been completely received therein and is approximately in a position as shown at e (Fig. 5), the pear is prevented from turning sidewise or turning over about its stem end. However, the diameter of the chutes is sufficiently large to permit free gravitation of the pears through the chute. Since the pears vary considerably in size, it is therefore necessary to grade the pears so as to assure that they are neither too small nor too large with respect to the diameter of the chutes. Chutes of different diameter are employed for small, medium size, or large pears, as will be obvious to those skilled in the art.

After the pears discharged from one transverse row of cups 44 into the chutes 151 have been oriented and delivered by said chutes to the pockets 186a and 186b, and while the next transverse row of elevator cups approaches its discharge position during its travel around the shaft 24, the feed chute assembly 3 is shifted from its position shown in Figures 1 and 16 to its position shown in Figure 17 by the rotary cam 194 in the manner as previously described herein.

When the feed chute assembly arrives in the position as shown in Figure 17, the short feed chutes 152 are now aligned with the succeeding row of elevator cups 44 and the pockets 188a and 188b, so that when the pears carried by these succeeding elevator cups are discharged therefrom, they are deposited into the short feed chutes 152 wherein they are oriented and by which they are conveyed to the pockets 188a and 188b in the same manner as previously described in connection with chutes 151 and pockets 186a and 186b.

After a pear has been fed to each pocket 186 of the feed mechanism 4, all pockets 186b and 188b of group II are rapidly opened and closed to discharge the pears stem end down therefrom into one group of fruit receiving and holding means of a pear processing machine, as shown in my copending application Serial No. 507,517, and thereafter all pockets 186a and 188a of group I of the feed mechanism 4 are rapidly opened and closed to discharge the pears stem end down from the same into another group of fruit receiving and holding means of a pear processing machine, while the feed chute assembly 3 is returned to the position shown in Figures 1 and 10 and the cycle of operation of the machine of the present invention repeats and continues in the same manner as described herein.

In this manner the pears dumped in a promiscuous mass into the supply hopper 106 are continuously fed in oriented position to the pockets 186 of the feed mechanism 4 and all that is necessary to assure the continuous operation of the machine at maximum feeding capacity is to maintain a sufficient supply of pears in the hopper 106.

It has been stated previously herein that the tank 1 and hopper 106 are filled with water to a predetermined level 137 (Fig. 3). However, if desired, the use of water may be eliminated and the fruit may be fed without the aid of water from the supply hopper 106. In such case, however, care has to be taken that the fruit is not bruised when it is dumped into the hopper 106 and that the hopper is not overfilled so as to eliminate bruising of the fruit by the elevator cups 44.

While, for the purpose of illustrating the present invention, a plurality of transverse rows of elevator cups and a plurality of feed and orienting chutes have been shown, it will be apparent that only one cup 44 on each cross bar 43 and a single stationary feeding and orienting chute 151 or 152 may be employed if it is desired to feed a fruit handling machine which is only capable of receiving one pear at a time. In such case, the width of the feed hopper 106 should be materially reduced, since only one grate structure 117 and one opening 121 in the hopper bottom 107 is necessary for such a small machine as will be obvious to those skilled in the art.

It has been mentioned in the above that by using the feed chutes as shown at 151 and 152 it is necessary to grade the fruit and that chutes of different diameter must be employed for small, medium size, or large pears. Therefore, when changing from one to another size of pears it is necessary to exchange the feed chutes. Since the exchange of feed chutes is time consuming and may be undesirable, a modified form of feed and orienting chute, as shown in Figures 7 to 12, inclusive, may be employed instead of the feed chutes 151 and 152 previously described herein. It being understood, however, that while only a short modified chute structure 216 which corresponds in length to the short chutes 152 has been shown herein, longer chutes of the same construction which correspond in length to the chutes 151 are employed in alternate order therewith in the same manner as the short and long chutes 151 and 152, previously described herein, as will be apparent to those versed in the art.

The chute 216 (Figs. 7 to 12) comprises an open ended trough 217 of substantially semi-circular configuration in cross section and an automatically adjustable guide structure 218 associated therewith. The trough 217 is of sufficient width to permit passage of the largest pears therethrough and the bottom portion 219 thereof is provided with a guide channel 221 of substantially rectangular configuration in cross section which extends over the entire length of the bottom in the center thereof. Mounted within the guide channel 221 and projecting from the front end of the trough 217 in forwardly declined position relative thereto is a tongue 222, which is adapted to extend into opening 77 and into the space between the rolls 91 and 92 so that the cups 44 may freely pass the same. The rear end of the tongue 222 is formed into a protuberance 223 extending transversely of the bottom portion 219 (Figs. 8 and 10) and projecting into the trough 217 slightly above the bottom portion thereof. The side walls of the trough 217 designated 224 and 225 terminate into outwardly flared and laterally inclined extensions 226 and 227 which project forwardly beyond the front end of the bottom portion 219 of the chute.

The guide 218 comprises two guide plates 228 and 229 connected by a stiff wire 231 which is welded thereto at 232 and 233 (Fig. 8). The wire 231 is made in the form of a bridge of sufficient height to permit passage of the fruit in the trough 217 therebeneath. Each guide plate 228 and 229 comprises a transversely disposed top portion 236, the inner side of which is bent upwardly and outwardly so as to form a curved inner guide wall 237. The outer side of each guide plate is bent downwardly to form a side wall 238. The front end 241 of each guide plate 228 and 229 is provided with a neck and stem end guiding and centering plate 242 which includes a downwardly declined portion 243, which is outwardly flared toward the receiving end of the chute 216, and an outwardly flared substantially vertical portion 244 bent outwardly at its upper end 246 to provide a curved edge 247. The entire guide structure 218 is hinged on the side walls 224 and 225 of the trough 217 by means of links 251 and 252 (Figs. 7, 9, and 10). The front ends of the links 251 and 252 are pivotally secured to the side walls 238 of the guide plates 228 and 229 by means of pivot pins 253 and 254, respectively. The rear ends of the links 251 and 252 are pivotally secured to the trough 217 by means of pivot pins 256 and 257 carried by the side wall portions 224 and 225. An extension 258 on each link is adapted to engage an abutment 261 on each side of the trough 217 to limit pivotal movement of the guide 218 about the rear end corners 263 and 264 of the trough 217 and to restrict upward movement of the guide 218 with respect to the trough.

The chute 216 is provided with a supporting bracket 181a, which is of the same construction as the supporting bracket 181 previously referred to herein and by means of which the chute is secured in rearwardly declined position to the transversely movable shaft 26 (Fig. 10).

When the modified form of the chute 216 is employed in connection with the machine of the present invention, a plurality of short and long chutes of this type are arranged in alternate order on the shaft 26 in rearwardly declined positions to form a chute assembly which is similar to and operated in the same manner as the chute assembly 3 previously described herein.

All of the chutes 216 function in the same manner and, therefore, only the description of the function of one chute 216 is given herein.

When a pear is discharged blossom end down by one of the feed cups 44 into the front end of the chute 216, the blossom end of the fruit is received by the tongue 222 and is guided by the flared extensions 226 and 227 toward the center of the chute. Thereupon in view of the momentum imparted upon the fruit during its discharge from the feed cup and declination of the chute, the pear gravitates into the chute and topples over with its stem end into leading position in the same manner, as previously described herein in connection with chute 151.

When a pear, however, is deposited sidewise into the chute 216 with the blossom end of the pear in leading position the pear gravitates downwardly in this position until the blossom end strikes the abutment 223. This engagement of the abutment 223 with the blossom end retards the downward movement thereof so that in view of the momentum of the fruit the same topples over whereby the pear is disposed with its stem end in leading position in the same manner as set forth in the above in connection with chute 151. In either case, however, the neck portion of the pear is received between the guide plates 242 and is guided thereby and the curved guide walls 237 as the pear topples over as above described (Figs. 10, 11, and 12).

When a small pear is deposited into the chute 216, the guide 218 remains in its normal or lowermost position as shown in Figure 7. However, if a pear of medium or large size is deposited into the chute 216, the bulb portion of the fruit engages the inwardly converging and downwardly and outwardly diverging guide walls 243 (Figs. 10, 11, and 12) and lifts the front end of the guide 218 sufficiently, as shown in full lines in Fig. 10, to permit entry of the pear into the trough 217 as the fruit topples over, as shown in dotted lines in Fig. 10, and gravitates toward the discharge end 266 of the chute. As soon as the pear is disposed with its stem end in leading position, the stem end of the pear enters the guide channel 221 which retains the same in this position during further travel of the fruit through the chute. The guide walls 244 and the curved edges 247 assist in properly guiding the fruit and as soon as the oriented pear is completely received within the chute 216 and is about in the position as shown in dot-dash lines at 269 and of such size that its bulb portion engages the top portions 236 (Fig. 10), the guide 218 pivots about the pivot pins 253 and 254 from its full line position to the position shown in dot-dash lines in Figure 10 whereby the front end of the guide is lowered and the rear end of the guide is lifted to permit further passage of the pear through the chute and subsequent discharge of the fruit stem end first therefrom. It should be noted, however, that the position of the guide 218 varies continuously as the fruit gravitates toward the discharge end of the chute. As soon as the pear leaves the chute, or if the bulb portion of the pear does not engage the top portions 236 after it has passed the front end of the guide, the guide 218 returns by its own gravity to its original position as shown in Fig. 7.

The top portions 236 which either engage the bulb portion of the pear or are slightly spaced therefrom, depending upon the size of the fruit, prevent turning of the pear about its stem end after orientation of the pear and during its further travel through the chute.

The entire guide structure 218 is of very light weight so that the same is easily lifted by the fruit and does not noticeably affect the gravitation of the pear through the chute while in engagement therewith.

From the above it will, therefore, be seen that when the modified chute structure 216 is used in connection with the machine of the present invention, pears of all sizes may be fed in properly oriented position, i. e., stem end first into the pockets 186 and 188 of the feed mechanism 4 or into any other type of fruit receiving means of a fruit handling or processing machine without changing of the chutes of the chute assembly 3 for different sizes of fruit.

While I have shown and described a preferred embodiment of my invention, such invention is capable of modification and variation without departing from the spirit and scope thereof as defined in the claims appended hereto.

Having thus described my invention, what I claim as new and desire to protect by Letters Patent is:

1. An apparatus for feeding and orienting pears comprising in combination a feed and orienting chute adapted to receive and guide pears along a predetermined path, a transferring conveyer for receiving pears in timed succession and in an indeterminate position from a promiscuous mass thereof, means associated with said transferring conveyor for orienting pears therein during a transferring conveyance of the pears, said transferring conveyor being adapted to deposit the oriented pears individually blossom end down at timed intervals into said chute, and means for mounting said chute in declined position to cause the pears received blossom end down therein to gravitate along said chute said chute being adapted to dispose the stem end of the pears in leading position therein.

2. A pear feeding and orienting mechanism comprising in combination, a supply hopper for receiving a promiscuous mass of pears, a conveyor adapted to travel into and out of said hopper through an opening in the bottom thereof for removing individual pears in indeterminate position from said mass and for subsequently discharging them therefrom, means associated with said conveyor for orienting the pears received thereby to a predetermined position prior to their discharge from said conveyor, an orienting chute mounted to receive the pears from said conveyor and to discharge the pears in oriented position therefrom, and means for receiving the oriented fruit discharged from said chute.

3. A pear feeding and orienting mechanism comprising in combination a supply hopper for receiving a promiscuous mass of pears, a conveyor adapted to travel into and out of said hopper through an opening in the bottom thereof for removing individual pears in indeterminate position from said mass and for subsequently discharging them therefrom, means associated with said conveyor for orienting the pears received therein in predetermined position prior to their discharge from said conveyor, an orienting chute for receiving the pears from said conveyor and for discharging the pears in oriented position therefrom, means associated with said chute for receiving the pears therefrom for positioning the pears with their stem blossom axes substantially vertical and for discharging them in said position, and means for operating said conveyor and said discharging means in timed relation with respect to each other.

4. A pear feeding and orienting mechanism comprising a movable feed and orienting chute assembly including a plurality of inclined chutes, means for feeding pears to every other chute of said assembly, a plurality of separate receiving means mounted adjacent the lower ends of said chutes and means for moving said assembly back and forth relative to said feeding means to alternately align alternate chutes with said feeding means and with separate receiving means.

5. A pear feeding and orienting mechanism comprising a movable feed and orienting chute assembly including a plurality of feed and orienting chutes, means for feeding individual pears at timed intervals to one end of every other chute of said assembly, separate receiving means mounted adjacent the other end of said chutes, and means for moving said chute assembly back and forth transversely of said feeding means and in timed relation to the operation thereof to alternately align alternate chutes of said assembly with said feeding means, and with separate receiving means.

6. A pear feeding and orienting mechanism comprising supply means containing a promiscuous mass of pears, a plurality of pear receivers disposed in a predetermined pattern removed from said supply means a movable feed and orienting chute assembly including a plurality of pear conveying and orienting chutes, disposed between the supply and the receivers, a conveyor intermediate said supply means and chute assembly for feeding individual pears from said promiscuous mass to said assembly, and means for moving said assembly transversely back and forth relative to said conveyor to alternately align one or the other of the orienting chutes with said conveyor and with alternate receivers of said plurality for transmission of pears from said conveyor to alternate receivers.

7. A pear feeding and orienting mechanism comprising a movable chute assembly including a plurality of declined pear conveying and orienting chutes to cause the pears received therein to gravitate therethrough and to discharge therefrom, a conveyor for feeding individual pears from a promiscuous mass thereof to said assembly and for depositing the pears one at a time blossom end down into each alternate chute of the assembly whereby the pears are caused to tip over in said chutes to dispose their stem ends into leading position during their gravitation through said chutes, and means for shifting the assembly relative to the conveyor to successively align alternate chutes of the assembly with said conveyor for reception of pears therefrom.

8. A pear feeding and orienting mechanism comprising a conveyor, a plurality of pear receiving pockets disposed at different distances from said conveyor, a pear conveying and orienting chute assembly intermediate said conveyor and pockets including chutes of different length and declination arranged in alternate order, and means for reciprocating said assembly between said conveyor and pockets for alternately feeding pears from said conveyor to pockets disposed at different distances therefrom.

9. An apparatus for feeding and orienting pears comprising a declined open ended chute, a hopper for receiving a promiscuous mass of pears, means for feeding the pears from said hopper to said chute and for depositing them blossom end down into said chute at one end thereof whereby the pears are caused to gravitate along said chute and to arrange themselves with their stem ends in leading position therein, a plurality of means at the other end of the chute for receiving the pears in oriented position therefrom, and means for depositing successive pears in alternate receiving means.

10. An apparatus for feeding and orienting pears comprising a declined chute, means for feeding individual pears from a promiscuous mass thereof to said chute and for depositing them blossom end down in said chute at the upper end thereof whereby the pears are caused to gravitate along said chute and to arrange themselves with their stem ends in leading position, a plurality of means at the lower end of the chute for receiving the pears in oriented position therefrom, and means for depositing successive pears in alternate receiving means.

11. A fruit feeding mechanism comprising in combination a conveyor adapted to convey fruit and to discharge pieces of said fruit at predetermined timed intervals at a predetermined zone, a plurality of fruit receivers mounted below said discharge zone, a shiftable chute assembly adapted to communicate alternate receivers of said plurality thereof with said discharge zone, and timed actuating means mounted to shift said chute assembly in timed relation with said conveyor to communicate alternate receivers with said discharge zone at the time of discharge of successive pieces of fruit therefrom.

12. A pear feeding and orienting mechanism comprising in combination, a supply hopper for containing a promiscuous mass of pears, a transferring conveyor adapted to transfer individual pears in timed succession from said hopper to a predetermined discharge zone, a plurality of receivers mounted below said discharge zone, a plurality of inclined chutes mounted for shifting movement to connect alternate receivers to the discharge zone, and means for shifting said chutes in timed relation to the discharge of pears from said conveyor at said discharge zone.

13. A pear feeding and orienting mechanism comprising a movable feed and orienting chute assembly including shiftable, inclined chute means, means for feeding pears successively to said chute means for gravitating movement therethrough, and means for shifting said chute means back and forth between a plurality of positions in timed relation to the feeding of pears thereto, thereby to discharge successive pears fed to said chute means at alternate points of discharge.

BURTON C. COONS.

REFERENCES CITED

The following references are of record in the file of this patent:

UNITED STATES PATENTS

| Number | Name | Date |
|---|---|---|
| 984,706 | Ray | Feb. 21, 1911 |
| 1,005,049 | Lorenzen | Oct. 3, 1911 |

(Other references on following page)

UNITED STATES PATENTS

| Number | Name | Date |
|---|---|---|
| 1,129,882 | McFeely | Mar. 2, 1915 |
| 1,184,057 | Vaux | May 23, 1916 |
| 1,185,329 | Janisch | May 30, 1916 |
| 1,246,648 | Peck | Nov. 13, 1917 |
| 1,266,668 | Drew | May 21, 1918 |
| 1,425,319 | Danberg | Aug. 8, 1922 |
| 1,492,112 | Watrous | Apr. 29, 1924 |
| 1,495,459 | Thompson | May 27, 1924 |
| 2,137,173 | Malloy | Nov. 15, 1938 |
| 2,265,515 | Carroll | Dec. 9, 1941 |
| 2,272,690 | Carroll | Feb. 10, 1942 |
| 2,296,490 | Ashlock | Sept. 22, 1942 |
| 2,298,614 | Carroll | Oct. 13, 1942 |
| 2,341,373 | Gantzer | Feb. 8, 1944 |
| 2,362,517 | Woodberry | Nov. 14, 1944 |

FOREIGN PATENTS

| Number | Country | Date |
|---|---|---|
| 1,427 of 1910 | Great Britain | Oct. 6, 1910 |